US011082600B2

(12) United States Patent
Tokunaga

(10) Patent No.: US 11,082,600 B2
(45) Date of Patent: Aug. 3, 2021

(54) ELECTRONIC APPARATUS THAT PERFORMS WIRELESS COMMUNICATION WITH AN IMAGE CAPTURING DEVICE AT TWO DIFFERENT COMMUNICATION SPEEDS, AND METHOD FOR CONTROLLING SAME

(71) Applicant: CANON KABUSHIKI KAISHA, Tokyo (JP)

(72) Inventor: Koshi Tokunaga, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/383,909

(22) Filed: Apr. 15, 2019

(65) Prior Publication Data
US 2019/0327406 A1 Oct. 24, 2019

(30) Foreign Application Priority Data
Apr. 20, 2018 (JP) .............................. JP2018-081736

(51) Int. Cl.
*H04N 5/232* (2006.01)
*G06F 1/16* (2006.01)
*G06F 3/0484* (2013.01)

(52) U.S. Cl.
CPC ....... *H04N 5/23206* (2013.01); *G06F 1/1698* (2013.01); *G06F 3/04847* (2013.01); *H04N 5/23227* (2018.08); *H04N 5/23296* (2013.01)

(58) Field of Classification Search
CPC ........... H04N 5/23206; H04N 5/23227; H04N 5/23296; H04N 5/232933; H04N 5/232939; H04N 5/23203; H04N 5/232061; H04N 5/23293; G06F 1/1698; G06F 3/04847
See application file for complete search history.

(56) References Cited

U.S. PATENT DOCUMENTS

| 8,731,469 B2 | 5/2014 | Tokunaga | |
|---|---|---|---|
| 2014/0095659 A1* | 4/2014 | Won | H04L 67/02 709/217 |
| 2014/0136213 A1* | 5/2014 | Kim | G06F 3/167 704/275 |

(Continued)

FOREIGN PATENT DOCUMENTS

JP 2002354149 A 12/2002

*Primary Examiner* — Albert H Cutler
(74) *Attorney, Agent, or Firm* — Venable LLP

(57) ABSTRACT

An electronic apparatus comprises a first communication unit for wireless communication, a second communication unit having a slower wireless communication speed than the first communication unit, a processing unit carrying out processing based on received requests, and a control unit that controls the communication, wherein, when a prescribed request has been received from an external device via a communication connection established via the second communication unit, the control unit starts connection processing with the external device using the first communication unit, and wherein the processing unit executes processing in accordance with the request received via the second communication unit in a period up until a communication connection is established by the first communication unit, and executes processing in accordance with the request received via the first communication unit after the communication connection has been established by the first communication unit.

6 Claims, 12 Drawing Sheets

(56) References Cited

U.S. PATENT DOCUMENTS

| | | | |
|---|---|---|---|
| 2014/0300763 A1 | 10/2014 | Tokunaga et al. | |
| 2016/0014322 A1* | 1/2016 | Kimura | H04N 7/185 |
| | | | 348/211.2 |
| 2016/0248965 A1* | 8/2016 | Fukuya | H04N 5/23293 |
| 2017/0272583 A1* | 9/2017 | Kasa | H04N 5/76 |
| 2019/0037172 A1* | 1/2019 | Choi | H04N 7/147 |

* cited by examiner

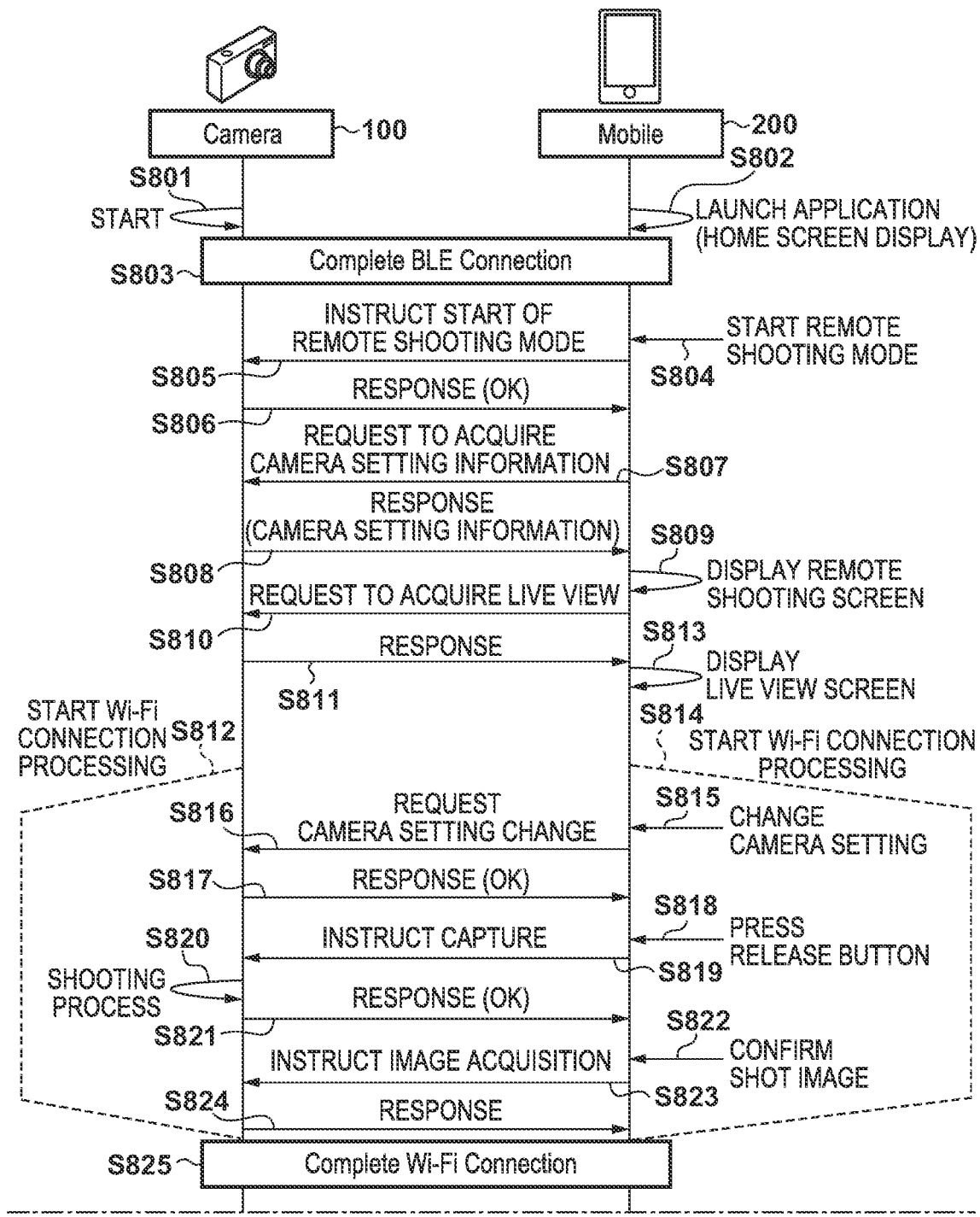

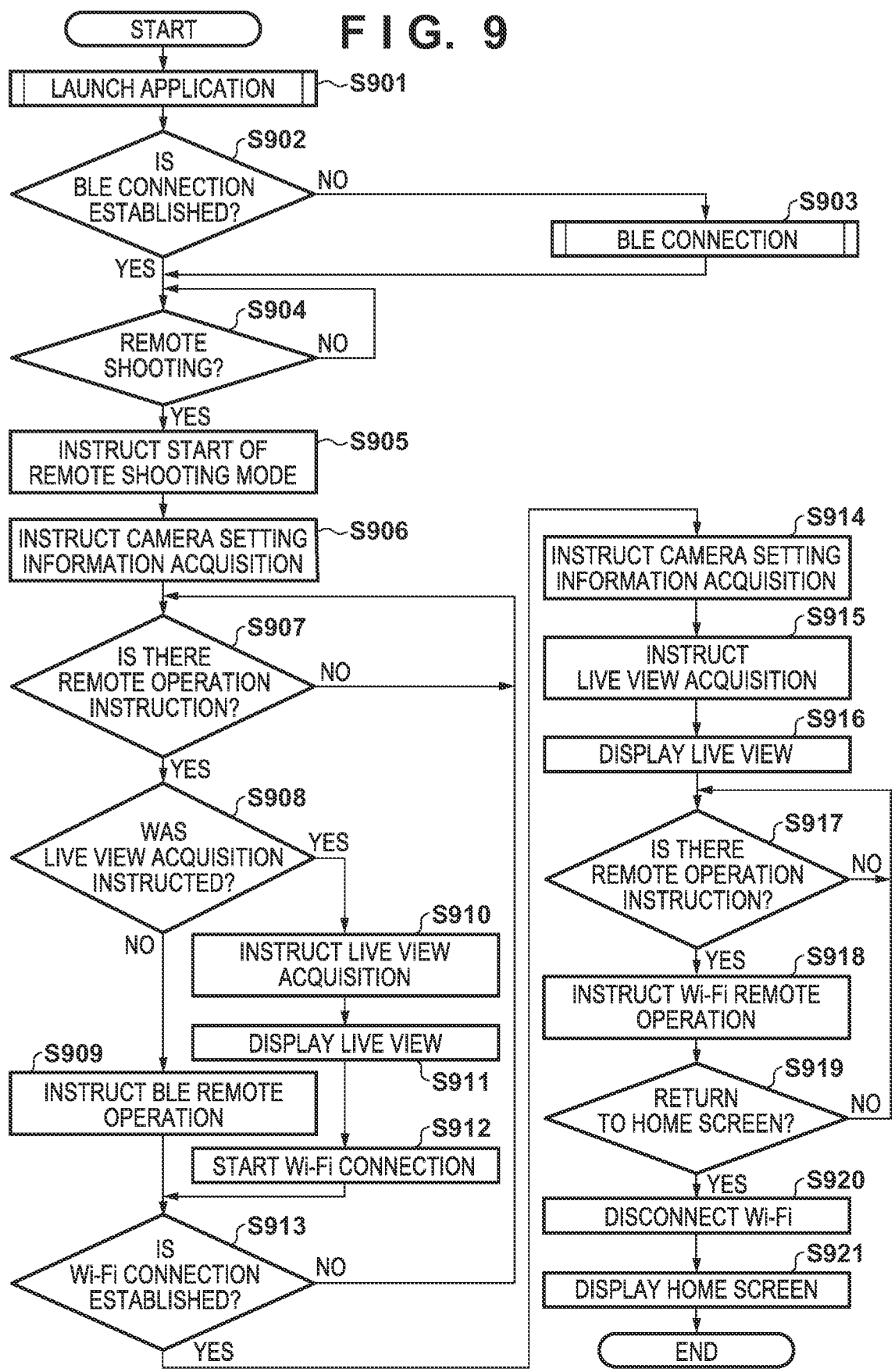

ELECTRONIC APPARATUS THAT PERFORMS WIRELESS COMMUNICATION WITH AN IMAGE CAPTURING DEVICE AT TWO DIFFERENT COMMUNICATION SPEEDS, AND METHOD FOR CONTROLLING SAME

BACKGROUND OF THE INVENTION

Field of the Invention

The present invention relates to an electronic apparatus and a method of controlling the same, and to a program.

Description of the Related Art

Digital cameras, digital video cameras, and the like that have wireless communication functions are known (e.g., Japanese Patent Laid-Open No. 2002-354149). This type of camera uses the wireless communication function to establish communication with a partner device such as a smartphone or a PC. This enables the partner device to remotely control the camera, request shooting, request changes to shooting parameters, and so on. Additionally, the partner device can receive images captured by the camera and display a live view, or in other words, a user can view video captured by the camera while at a distance from the camera.

Many types of wireless communication exist, but it is common to use communication means with fast data transfer speeds and that can transmit large amounts of data at one time, such as wireless LAN, to satisfactorily realize remote shooting functions such as live view and transferring image files. However, wireless LAN takes a long time to complete a connection, and thus users often miss shooting opportunities while waiting for the connection to be established.

SUMMARY OF THE INVENTION

Having been achieved in light of such problems, the present invention provides a technique in which even when both an operating electronic apparatus and an operated electronic apparatus have a plurality of communication means, a user's intended processing can be carried out by switching the communication means without any special attention on the part of the user.

According to an aspect of the invention, there is provided an electronic apparatus that carries out wireless communication with an external device and functions as an apparatus that is operated by the external device, the electronic apparatus comprising: a first communication unit for wireless communication; a second communication unit for wireless communication having a slower communication speed than the first communication unit; a processing unit that carries out processing based on requests received via the first and second communication units; and a control unit that controls the communication carried out via the first and second communication units, wherein when a prescribed request has been received from the external device with which a communication connection has been established via the second communication unit, the control unit starts connection processing with the external device using the first communication unit; and wherein the processing unit executes processing in accordance with the request received via the second communication unit in a period up until a communication connection is established by the first communication unit, and executes processing in accordance with the request received via the first communication unit after the communication connection has been established by the first communication unit.

According to the present invention, even when both an operating electronic apparatus and an operated electronic apparatus have a plurality of communication means, a user's intended processing can be carried out by switching the communication means without any special attention on the part of the user.

Further features of the present invention will become apparent from the following description of exemplary embodiments (with reference to the attached drawings).

BRIEF DESCRIPTION OF THE DRAWINGS

FIGS. 8A and 8B are diagrams illustrating a communication sequence carried out between the digital camera and the mobile phone according to a second embodiment.

FIG. 9 is a flowchart illustrating processing by the mobile phone according to the second embodiment.

DESCRIPTION OF THE EMBODIMENTS

Hereinafter, embodiments of the present invention will be described in detail with reference to the appended drawings. Note that the embodiments described hereinafter are merely examples of means for carrying out the present invention, and may be revised or changed as appropriate in light of the specific configurations of devices in which the present invention is applied, various conditions, and the like. Multiple embodiments can also be combined as appropriate.

The following embodiments will describe examples in which a digital camera serves as an electronic apparatus that is controlled, and a mobile phone serves as an electronic apparatus functioning as a device (a control device) that carries out the control in response to user operations.

First Embodiment

Configuration of Digital Camera

The following will describe a digital camera having a wireless communication function as an example of a communication device serving as a data transfer source. Note that the present invention can be applied in any desired device that has a wireless communication function and is capable of transferring data. A mobile phone, a personal computer, a tablet terminal, a game console, or the like can be given as an example of this type of apparatus, but another apparatus may be used instead. While it is desirable that the apparatus includes an image capturing unit, the image capturing unit is not absolutely necessary, as long as the apparatus has a function for importing image data from a digital camera or the like, for example.

Figure 1A:
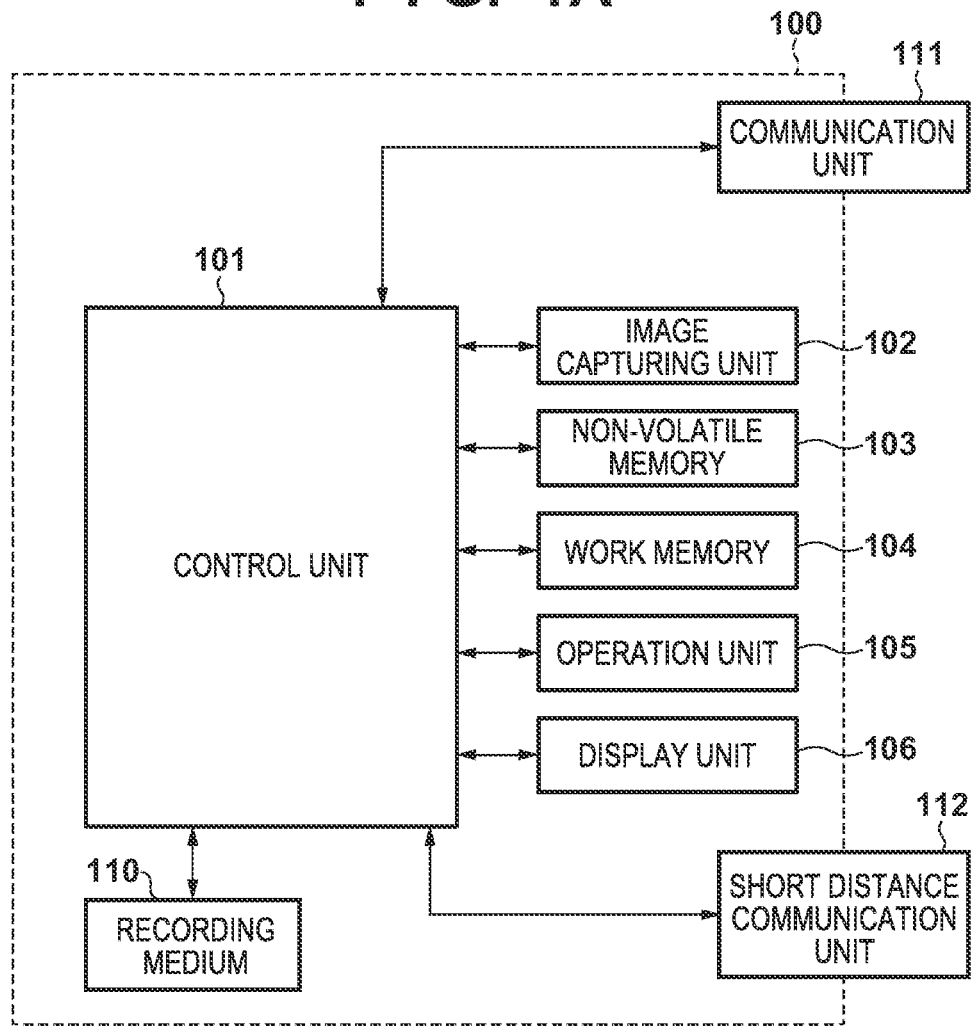
FIG. 1A is a block diagram illustrating a digital camera serving as a communication device according to embodiments.

FIG. 1A is a block diagram illustrating an example of the configuration of a digital camera 100, which is an example of the communication device according to the present embodiment. Although a digital camera is described here as an example of the communication device, the communication device is not limited thereto. For example, the communication device may be any information processing device, such as a portable media player, a so-called tablet device, a personal computer, or the like.

A control unit 101 is constituted by a CPU. The control unit 101 controls the various parts of the digital camera 100 in response to input signals, programs (described later), and the like. Note that a plurality of pieces of hardware may control the overall device by sharing processes rather than the control unit 101 controlling the overall device.

An image capturing unit 102 is constituted by, for example, an optical system that controls an optical lens unit as well as aperture, zoom, and focus, an image sensor for converting light (an image) entering through the optical lens unit into an electrical image signal, and so on. A Complementary Metal Oxide Semiconductor (CMOS), a Charge Coupled Device (CCD), or the like is typically used as the image sensor. Under the control of the control unit 101, the image capturing unit 102 uses the image sensor to convert subject light, formed as an image by a lens included in the image capturing unit 102, into an electrical signal, carries out noise reduction processing and the like, and outputs digital data as image data. The digital camera 100 according to the present embodiment records the image data in a recording medium 110 in accordance with the Design Rule for Camera File System (DCF) standard, for example.

Non-volatile memory 103 is non-volatile memory that can be electrically erased and recorded to, and stores programs and the like (described later) that are executed by the control unit 101.

Work memory 104 is used as buffer memory that temporarily stores the image data captured by the image capturing unit 102, image display memory for a display unit 106, a work region for the control unit 101, and so on.

An operation unit 105 is used for accepting instructions, made by the user in the digital camera 100, from the user. The operation unit 105 includes, for example, a power button through which the user instructs the power of the digital camera 100 to be turned on and off, a release switch for instructing a shot to be taken, a playback button for instructing image data to be played back, and so on. The operation unit 105 further includes operation members such as a dedicated "connect" button for starting communication with an external device via a communication unit 111 (described later). The operation unit 105 also includes a touch panel formed on the display unit 106, which will be described later. Note that the release switch includes a first switch and a second switch. The first switch turns on when the release switch is put into a so-called half-pressed state. An instruction for carrying out shooting preparations such as an autofocus (AF) process, an automatic exposure (AE) process, an auto white balance (AWB) process, and a flash pre-emission (EF) process is received as a result. The second switch turns on when the release switch is put into a so-called fully-pressed state. An instruction for taking a shot is received as a result.

The display unit 106 displays a viewfinder image at the time of shooting, shot image data, and text for interactive operations. Note that the display unit 106 does not absolutely need to be built into the digital camera 100. It is sufficient for the digital camera 100 to be capable of connecting to an internal or external display unit 106 and have at least a display control function for controlling the display in the display unit 106.

The recording medium 110 can record image data output from the image capturing unit 102. The recording medium 110 may be configured to be removable from the digital camera 100, or may be built into the digital camera 100. In other words, it is sufficient for the digital camera 100 to at least have means for accessing the recording medium 110.

The communication unit 111 is an interface for connecting to an external device. The digital camera 100 of the present embodiment can exchange data with the external device via the communication unit 111. For example, the image data generated by the image capturing unit 102 can be transmitted to the external device via the communication unit 111. In the present embodiment, the communication unit 111 includes an interface for communicating with an external device via a so-called wireless LAN according to the IEEE 802.11 standard. The control unit 101 implements wireless communication with the external device by controlling the communication unit 111. Note that the communication method is not limited to wireless LAN, and includes an infrared communication method as well, for example. The communication unit 111 is one means for realizing first wireless communication.

A short distance communication unit 112 is constituted by, for example, an antenna for wireless communication, and a modulation/demodulation circuit and a communication controller for processing wireless signals. The short distance communication unit 112 outputs the modulated wireless signal from the antenna, and demodulates the wireless signal received by the antenna, whereby short distance wireless communication according to the IEEE 802.15 standard (known as Bluetooth (registered trademark)) is realized. In the present embodiment, the power-saving Bluetooth (registered trademark) Low Energy v4.0 is employed as the Bluetooth (registered trademark) communication. This Bluetooth (registered trademark) communication has a narrower range of communication than wireless LAN communication (in other words, has a shorter communication distance). Additionally, Bluetooth (registered trademark) communication is slower than wireless LAN communication. However, Bluetooth (registered trademark) communication uses less power than wireless LAN communication.

In the present embodiment, the communication speed of the communication implemented by the communication unit 111 is higher than the communication speed of the communication implemented by the short distance communication unit 112. The communication range of the communication implemented by the communication unit 111 is greater than that of the communication implemented by the short distance communication unit 112.

Note that the communication unit 111 of the digital camera 100 in the present embodiment has an AP mode that operates as an access point in infrastructure mode and a CL mode that operates as a client in infrastructure mode. By operating the communication unit 111 in CL mode, the digital camera 100 of the present embodiment can operate as a CL device in infrastructure mode. When the digital camera 100 operates as a CL device, the digital camera 100 can join a network formed by a nearby AP device by connecting to the AP device. In addition, by operating the communication unit 111 in AP mode, the digital camera 100 of the present embodiment can operate as a simplified AP (hereinafter referred to as a "simple AP") which is a kind of AP, but has limited functions. When the digital camera 100 operates as a simple AP, the digital camera 100 forms a network by itself. A device in the vicinity of the digital camera 100 can recognize the digital camera 100 as an AP device and join a network formed by the digital camera 100. A program for causing the digital camera 100 to function as described above is held in the non-volatile memory 103.

The digital camera 100 of the present embodiment is a simple AP that, while being a kind of AP, does not have a gateway function for transferring data received from the CL device to an internet provider or the like. Accordingly, even if the digital camera 100 receives data from another device that has joined the network formed by the digital camera 100, that data cannot be transferred to a network such as the internet.

Figure 1B:
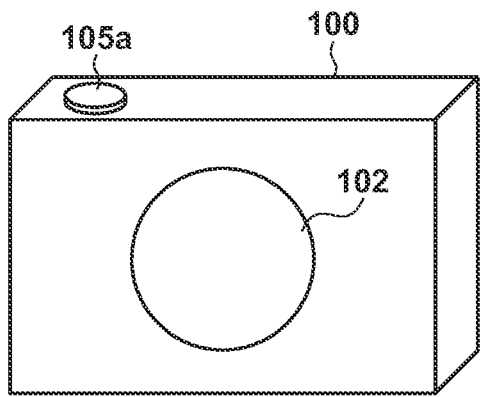
FIG. 1B is a front view of the digital camera.
Figure 1C:
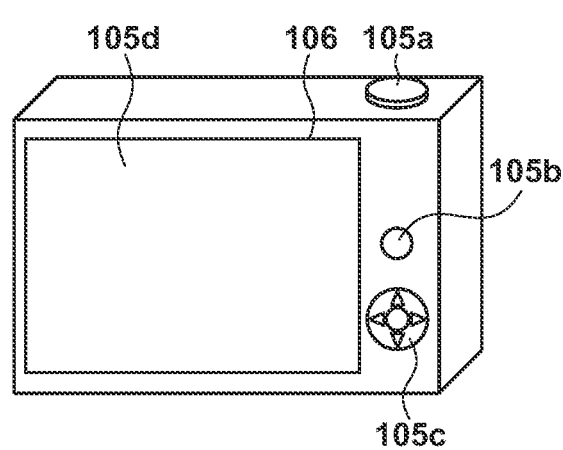
FIG. 1C is a rear view of the digital camera.

The external appearance of the digital camera 100 will be described next. FIG. 1B is a diagram illustrating the appearance of a front face of the digital camera 100, and FIG. 1C is a diagram illustrating the appearance of a rear face of the digital camera 100. A release switch 105a, a playback button 105b, a directional key 105c, and a touch panel 105d are operational members included in the above-described operation unit 105. Images obtained through the capturing by the image capturing unit 102 are also displayed in the display unit 106. The foregoing has been a description of the digital camera 100.

Configuration of Mobile Phone

Figure 2:
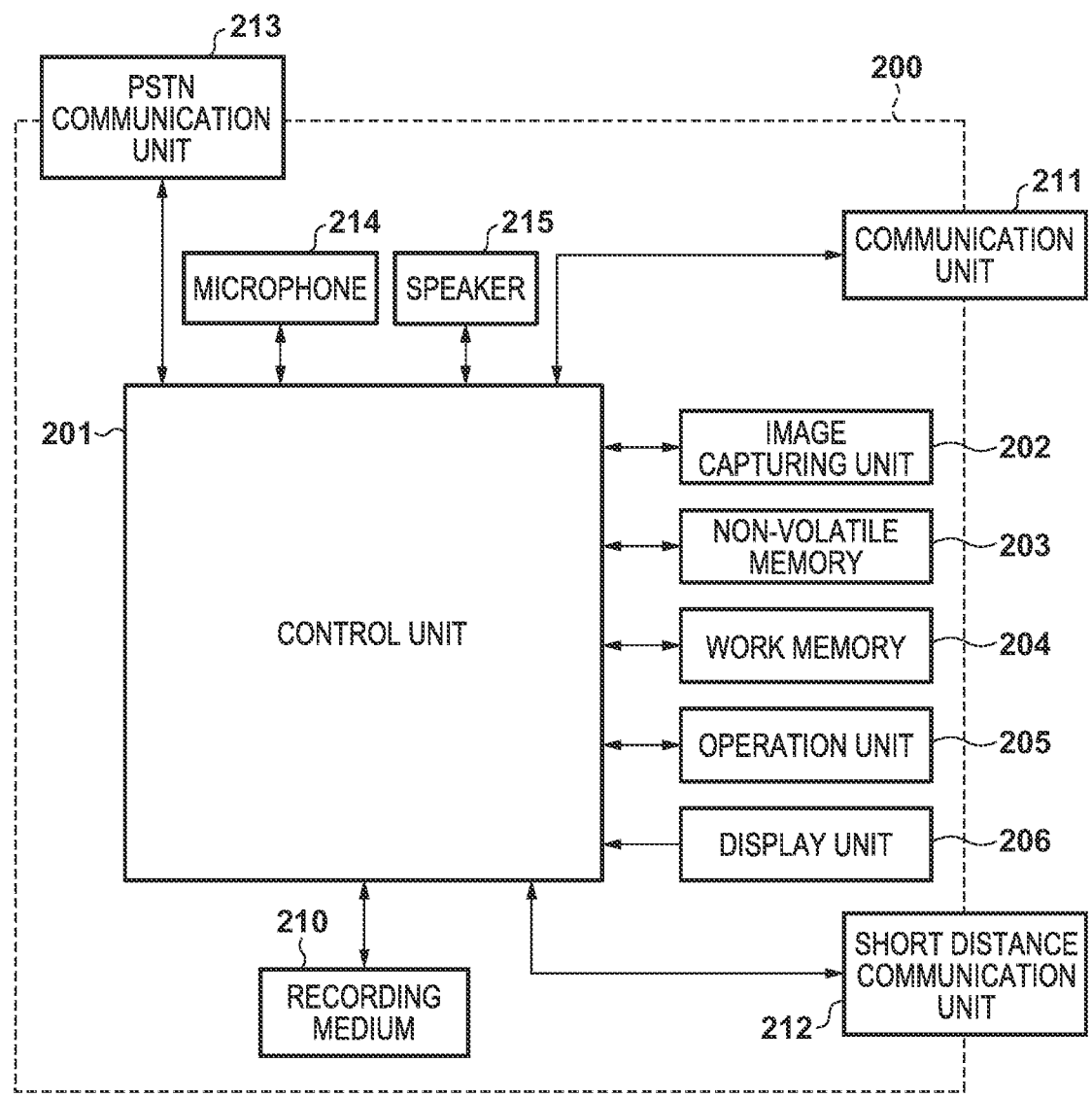
FIG. 2 is a block diagram illustrating a mobile phone serving as an information processing device according to embodiments.

FIG. 2 is a block diagram illustrating an example of the configuration of a mobile phone 200 serving as an example of an information processing device according to the present embodiment. Although a mobile phone is described here as an example of an information processing device, the information processing device is not limited thereto. The information processing device may be a smartphone, a digital camera having wireless functionality, a tablet device, a personal computer (PC), or the like, for example.

A control unit 201 is constituted by a CPU. The control unit 201 controls the various parts of the mobile phone 200 in response to input signals, programs (described later), and the like. Note that a plurality of pieces of hardware may control the overall device by sharing processes rather than the control unit 201 controlling the overall device.

An image capturing unit 202 converts subject light, formed as an image by a lens included in the image capturing unit 202, into an electrical signal, carries out noise reduction processing and the like, and outputs digital data as image data. The captured image data is stored in buffer memory, subjected to predetermined processing by the control unit 201, and is then recorded into a recording medium 210.

Non-volatile memory 203 is non-volatile memory that can be electrically erased and recorded to. An operating system (OS), which is basic software executed by the control unit 201, applications that implement practical functions by operating cooperatively with the OS, and the like are recorded in the non-volatile memory 203. Additionally, in the present embodiment, an application for communicating with the digital camera 100 is stored in the non-volatile memory 203.

Work memory 204 is used as image display memory for a display unit 206, a work region for the control unit 201, and so on. An operation unit 205 is used for accepting instructions, made by the user in the mobile phone 200, from the user. The operation unit 205 includes operation members such as, for example, a power button through which the user instructs the power of the mobile phone 200 to be turned on and off, a touch panel formed on the display unit 206, and the like. The display unit 206 displays image data, text for interactive operations, and so on. Note that the mobile phone 200 does not absolutely need to include the display unit 206. It is sufficient for the mobile phone 200 to be capable of connecting to the display unit 206 and have at least a display control function for controlling the display in the display unit 206.

The recording medium 210 can record image data output from the image capturing unit 202. The recording medium 210 may be configured to be removable from the mobile phone 200, or may be built into the mobile phone 200. In other words, it is sufficient for the mobile phone 200 to at least have means for accessing the recording medium 210.

A communication unit 211 is an interface for connecting to an external device. The mobile phone 200 of the present embodiment can exchange data with the digital camera 100 via the communication unit 211. In the present embodiment, the communication unit 211 is an antenna, and the control unit 201 can connect to the digital camera 100 via the antenna. The communication unit 211 includes an interface for communicating in accordance with the IEEE 802.11 standard, known as "wireless LAN". The control unit 201 implements wireless communication with the external device by controlling the communication unit 211. Note that the connection with the digital camera 100 may be a direct connection, or may be a connection made via an access point. Picture Transfer Protocol over Internet Protocol (PTP/IP) through wireless LAN, for example, can be used as the protocol for communicating data. Note, however, that the communication with the digital camera 100 is not limited thereto. For example, the communication unit 211 can include an infrared communication module, a Bluetooth (registered trademark) communication module, a wireless communication module such as Wireless USB, or the like. Furthermore, a hard-wire connection such as a USB cable, HDMI (registered trademark), IEEE 1394, or the like may be employed.

A short distance communication unit 212 is constituted by, for example, an antenna for wireless communication, and a modulation/demodulation circuit and a communication controller for processing wireless signals. The short distance communication unit 212 outputs the modulated wireless signal from the antenna, and demodulates the wireless signal received by the antenna, whereby short distance wireless communication according to the IEEE 802.15 standard is realized. In the present embodiment, the short distance communication unit 112 communicates with other devices using the IEEE 802.15.1 standard (known as "Bluetooth"). In the present embodiment, the power-saving Bluetooth (registered trademark) Low Energy (BLE) v4.0 is employed as the Bluetooth (registered trademark) communication, but Bluetooth (registered trademark) Classic may be employed instead.

A PSTN communication unit 213 is an interface used when carrying out public line wireless communication. The mobile phone 200 can make voice calls with other devices via the PSTN communication unit 213. At this time, the voice calls are implemented by the control unit 201 inputting and outputting audio signals via a microphone 214 and a speaker 215. In the present embodiment, the PSTN communication unit 213 is an antenna, and the control unit 101 can connect to a public network via the antenna. Note that the communication unit 211 and the PSTN communication unit 213 can also share a single antenna. The foregoing has been a description of the mobile phone 200.

Overview of Connection Formats

In the present embodiment, the digital camera 100 and the mobile phone 200 are capable of communicating through communication via the communication unit 111 and the communication unit 211 as described above ("first communication" hereinafter), and communication via the short distance communication unit 112 and the short distance communication unit 212 ("second communication" hereinafter).

A characteristic of the first communication is that while it takes more time to establish a connection and enter a state where data can be transferred than with the second communication, data can be transferred faster, and more data can be transferred at once, than with the second communication. Conversely, the second communication can establish a connection faster than the first communication, but the transfer speed of the second communication is slower.

The control unit 201 controls the digital camera 100 by loading programs stored in the non-volatile memory 203 into the work memory 204, and then sending instruction commands to the digital camera 100 through the first communication or the second communication. For example, image data stored in the recording medium 110 as a result of the digital camera 100 being operated to shoot an image can be transferred to and stored in the recording medium 210 of the mobile phone 200, remotely control shooting functions of the digital camera 100 by operating the release switch, changing shooting parameters, acquiring a live view, which is a video currently being captured, and the like.

Communication Sequence of Digital Camera 100 and Mobile Phone 200

An operation sequence through which the digital camera 100 is remotely controlled from the mobile phone 200 through the above-described first and second communications will be described in detail next. Note that the processing by the digital camera 100 indicated in the following sequence and flowchart is realized by the control unit 101 controlling parts of the digital camera 100 in accordance with programs. The processing by the mobile phone 200 is realized by the control unit 201 controlling parts of the mobile phone 200 in accordance with programs.

Figure 3A:
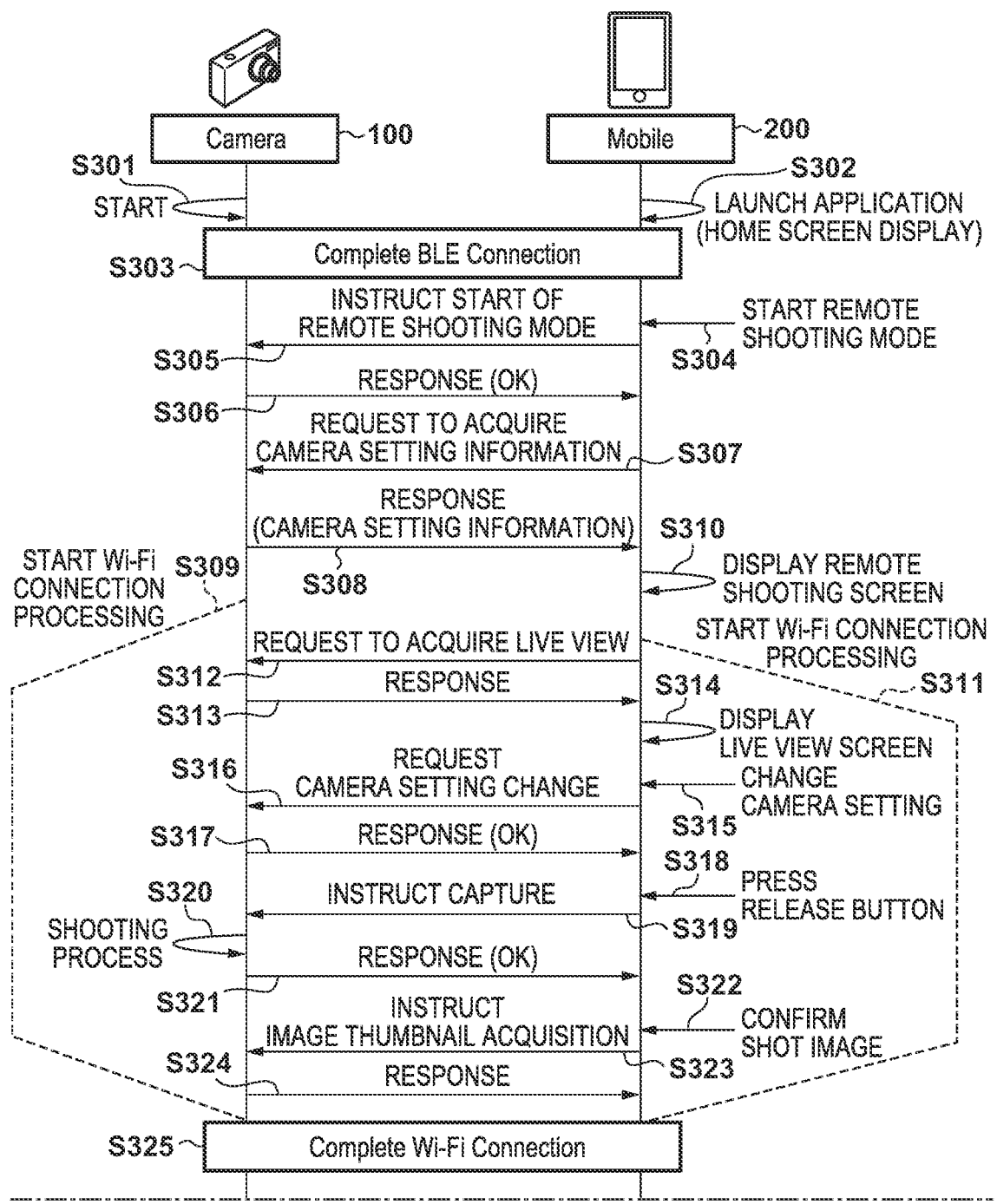
FIGS. 3A and 3B are diagrams illustrating a communication sequence carried out between the digital camera and the mobile phone according to a first embodiment.
Figure 3B:
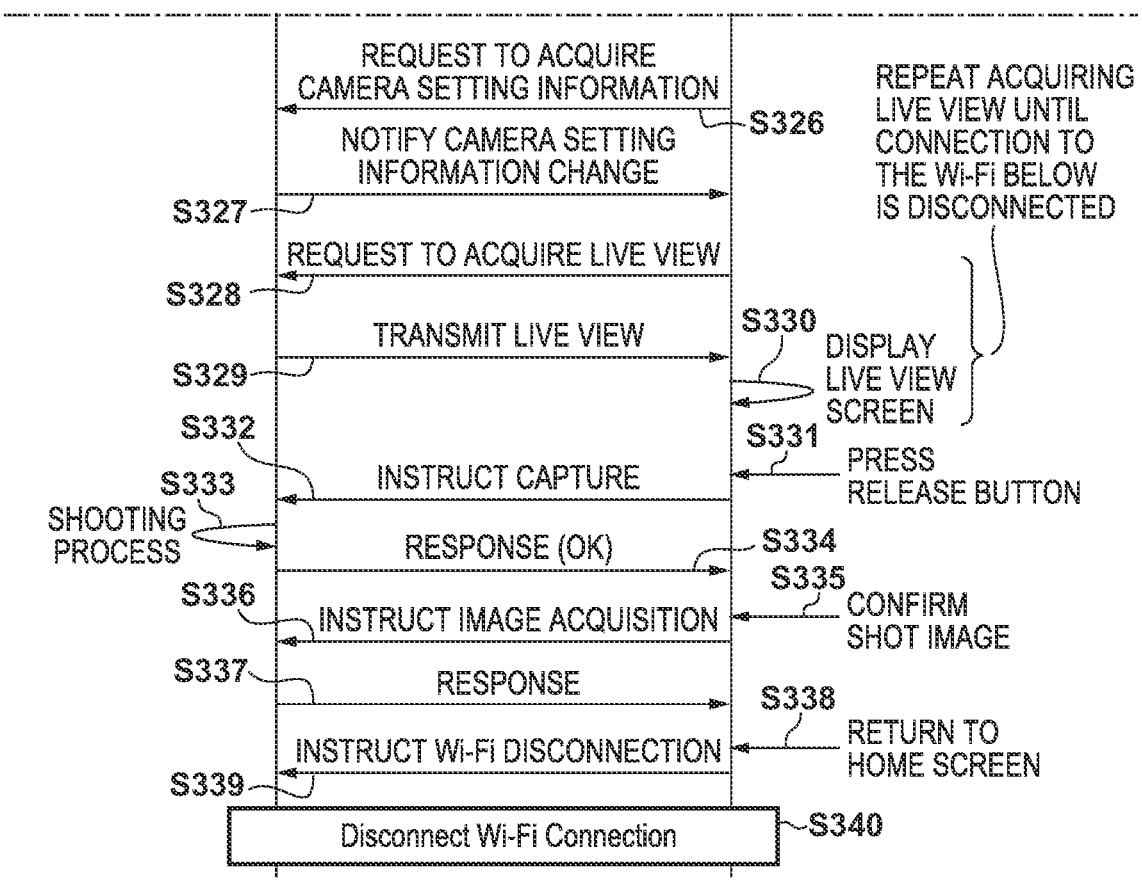

FIGS. 3A and 3B are sequence charts illustrating operations carried out by the digital camera 100 and the mobile phone 200 during the remote operation according to the present embodiment. FIGS. 4A to 4E illustrate a graphical user interface (GUI) displayed in the display unit 106 of the digital camera 100 during the remote operation according to the present embodiment. FIGS. 5A to 5G illustrate a GUI, provided by an application for executing the stated operations, which is displayed in the display unit 206 of the mobile phone 200 during the remote operation according to the present embodiment.

First, in S301, the camera is started up in response to the control unit 101 detecting that the power button in the operation unit 105 has been pressed by the user.

Figure 5A:
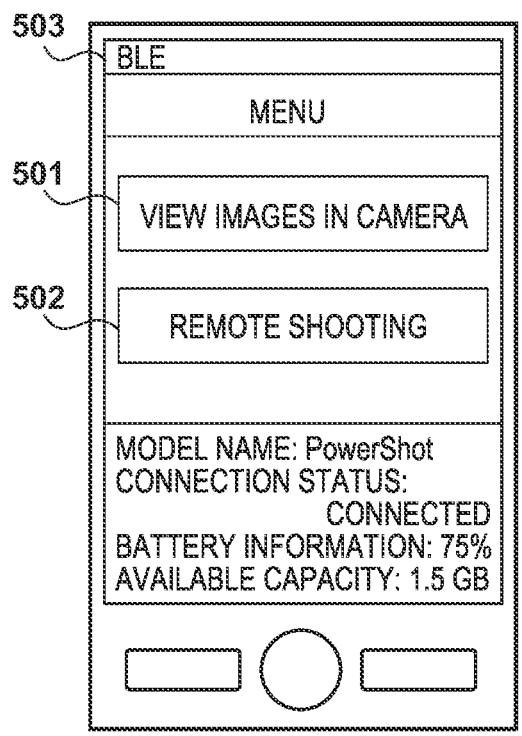
FIGS. 5A to 5G are diagrams illustrating a user interface of the mobile phone according to the first embodiment.

Upon detecting, in S302, that an instruction for launching an application for executing these operations has been made by the user, the control unit 201 launches the application and displays a home screen of the application, which is illustrated in FIG. 5A, in the display unit 206. In the present embodiment, the home screen of the application includes a function for viewing images saved in the recording medium 110, corresponding to the GUI button indicated by reference sign 501, a function for taking a shot by remotely controlling the camera 100, corresponding to the GUI button indicated by reference sign 502, and the like. The GUI buttons 501 and 502 can be selected by the user via the display unit 206.

Figure 4A:
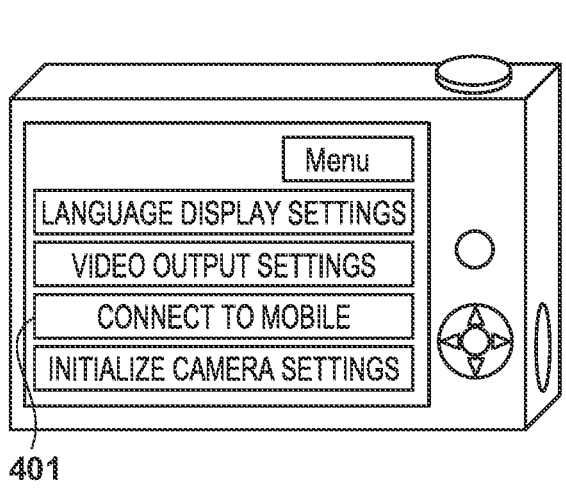
FIGS. 4A to 4E are diagrams illustrating a user interface of the digital camera according to the first embodiment.
Figure 4B:
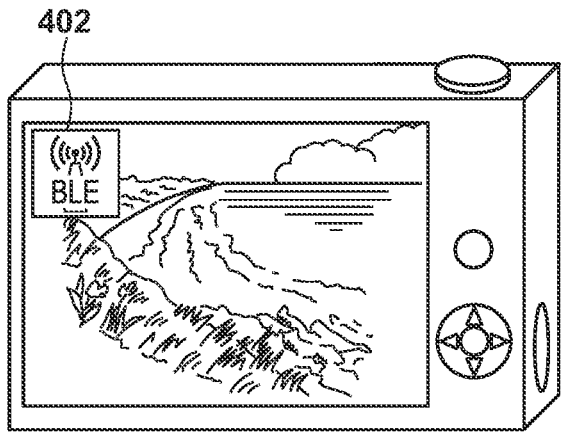

In S303, the control unit 101 and the control unit 201 establish a BLE connection (a second communication connection) via the short distance communication unit 112 and the short distance communication unit 212. Although the digital camera 100 according to the embodiments may start the BLE connection processing upon the camera starting up, without being instructed by the user, the BLE connection may be started in response to the user selecting an item 401 in the GUI menu displayed in the display unit 106, as illustrated in FIG. 4A. On the other hand, the mobile phone 200 automatically starts the BLE connection upon the home screen being displayed. If both the digital camera 100 and the mobile phone 200 have successfully prepared for the connection, the BLE connection is established. Once the BLE connection is successfully established, the control unit 101 displays an icon 402, which indicates that BLE communication has been established, in the display unit 106, as indicated in FIG. 4B. Likewise, the control unit 201 displays an icon 503, which indicates that BLE communication has been established, in the display unit 206, as indicated in FIG. 5A. Although not shown here, the control unit 201 acquires the information indicating the camera model name, battery state, and amount of available space in the recording medium 110 from the digital camera 100 via the short distance communication unit 212, and displays that information in the home screen.

In S304, the control unit 201 detects a remote shooting function being started in response to the user selecting, through the operation unit 205, a button indicated by GUI 502 in FIG. 5A.

In S305, the control unit 201 sends a remote shooting mode processing start request to the digital camera 100 via the short distance communication unit 212.

In S306, upon detecting that the remote shooting mode processing start request has been received from the mobile phone 200 via the short distance communication unit 112, the control unit 101 transitions to a state in which remote shooting can be carried out. The "state in which remote shooting can be carried out" means that camera functions such as taking a shot, changing shooting parameters, generating a live view, and so on can be carried out at any time. When the transition to the state in which remote shooting can be carried out is complete, the control unit 101 returns a response, indicating that the state change is complete, to the mobile phone 200 via the short distance communication unit 112.

In S307, the control unit 201 makes an instruction for acquiring camera setting information of the digital camera 100 via the short distance communication unit 212. The "camera setting information" is information indicating a list of types of shooting parameters that can be set in the digital camera 100 (shooting mode, exposure correction value, ISO value (sensitivity), AV value, TV value, shot image format, shot image size, zoom position, and the like), the values that are currently set, and ranges of the values that can be set. This information is valid in the BLE connection in which communication takes place via the short distance communication unit 112 and the short distance communication unit 212.

In S308, upon detecting the instruction to acquire the camera setting information from the mobile phone 200 via the short distance communication unit 112, the control unit 101 returns the camera setting information to the mobile phone 200 via the short distance communication unit 112.

Figure 4C:
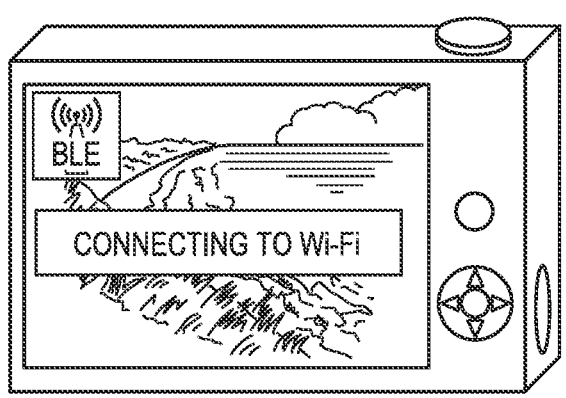

As a result, the control unit 101 can determine that the mobile phone 200 can function as a wireless remote controller for the digital camera 100. Then, in S309, the control unit 101 starts wireless LAN (Wi-Fi) connection processing (first communication connection processing) via the communication unit 111, and displays, in the display unit 106, a message indicating that the wireless LAN connection processing is underway, as indicated in FIG. 4C. Although the present embodiment assumes a format in which the digital camera 100 functions as an access point and stands by for a connection from the mobile phone 200, the present embodiment can also be realized through a format in which the digital camera 100 joins an access point that can enter the same network as the mobile phone 200.

Figure 5B:
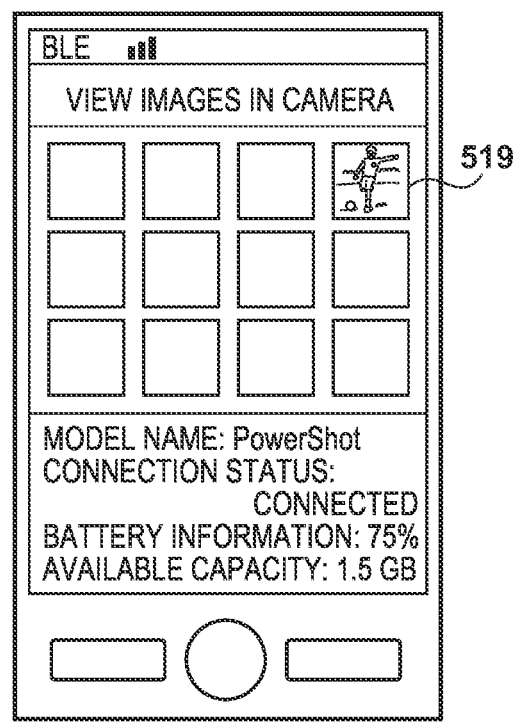
Figure 5C:
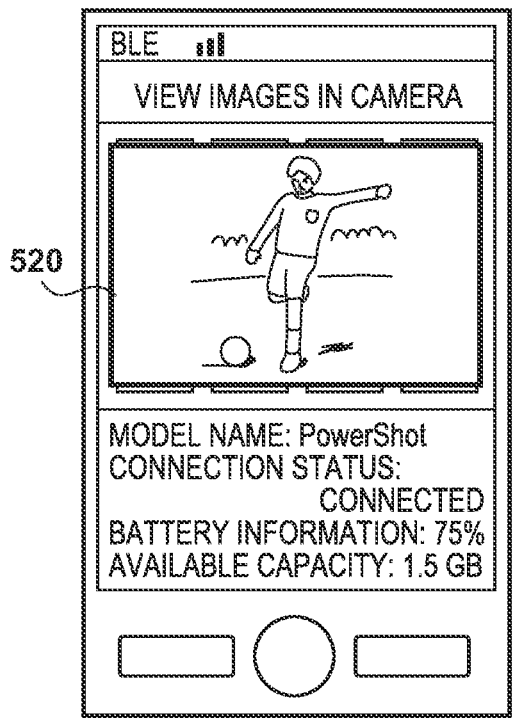
Figure 5D:
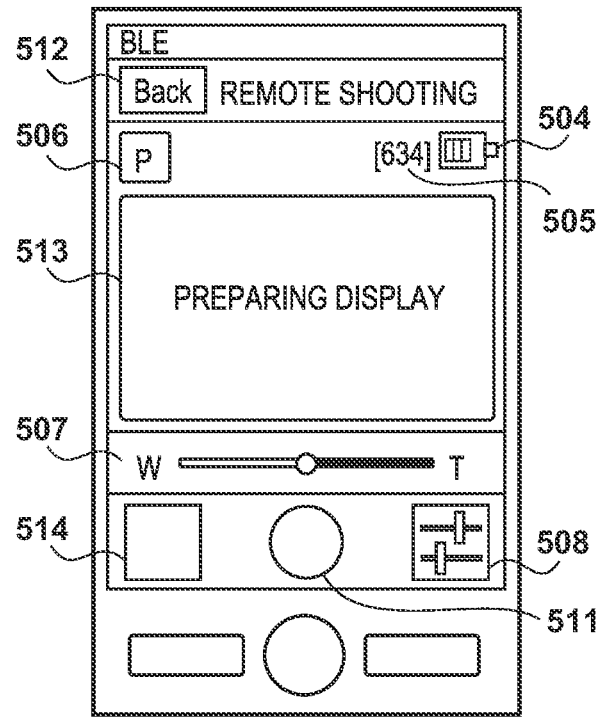

In S310, the control unit 201 displays, in the display unit 206, a GUI indicating that remote shooting instructions can be made to the digital camera 100, as indicated in FIG. 5D. The GUI components indicated in FIG. 5D and described below are configured on the basis of the camera setting information acquired from the digital camera 100 in S303, S308, and the like.

Figure 5E:
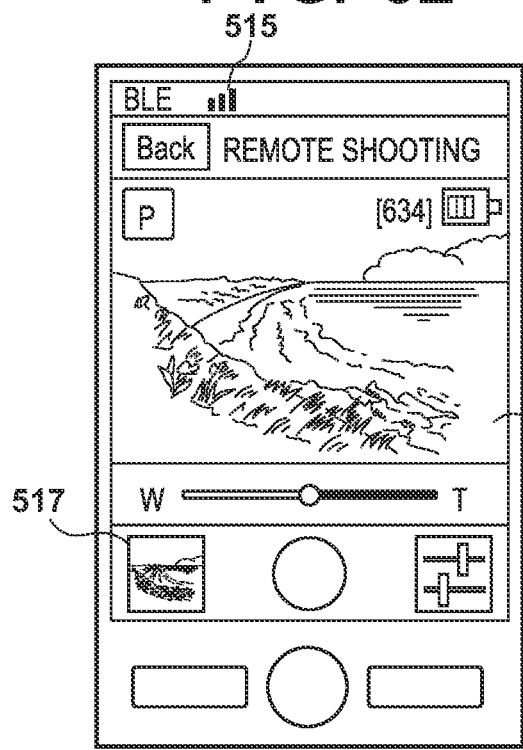

GUI 504 represents an icon displaying the remaining battery power of the digital camera 100. GUI 505 represents an icon displaying the remaining number of still images that can be shot. GUI 506 represents an icon indicating the shooting mode set in the digital camera 100. GUI 507 represents the current zoom position of the digital camera 100, and is also a controller for instructing zoom magnification. GUI 508 is a button for transitioning to a screen for changing the shooting parameters that can be set in the digital camera 100. GUI 509, indicated in FIG. 5G, is displayed when the button indicated by GUI 508 is pressed, and can change the value set for the ISO value. Although not shown, when there are a plurality of shooting parameters that can be set by the digital camera 100, such as the exposure correction value, AV value, TV value, shot image format, and shot image size, those parameters can be set through the screen. After the setting values have been changed, the screen returns to FIG. 5D in response to GUI 510 being pressed. GUI 511 is a button for instructing shooting. GUI 512 is a button for canceling the remote shooting and returning to the home screen illustrated in FIG. 5A. GUI 513 is a region where the live view of the digital camera 100 is displayed. GUI 514 is a region for displaying a thumbnail of a shot image.

In S311, the control unit 201 starts the wireless LAN (Wi-Fi) connection processing (the first communication connection processing) via the communication unit 211. As described earlier, although the present embodiment assumes a format in which the digital camera 100 functions as an access point and stands by for a connection from the mobile phone 200, the present embodiment can also be realized through a format in which the digital camera 100 joins an access point that can enter the same network as the mobile phone 200.

In S312, the control unit 201 makes an instruction for a request to acquire the live view from the digital camera 100 via the short distance communication unit 212.

In S313, upon receiving the instruction for the request to acquire the live view from the mobile phone 200 via the short distance communication unit 112, the control unit 101 returns information indicating that the live view cannot be sent (is unprocessed) to the mobile phone 200 via the short distance communication unit 112.

In S314, the control unit 201 displays, in GUI 513, an indication that the live view cannot be displayed. The present embodiment describes an example in which nothing is displayed in GUI 513 before S312 is carried out, but after the processing of S312 and S313, text reading "preparing display", as indicated in FIG. 5D, is displayed, due to the wireless LAN connection having been started in S311. Because the mobile phone 200 detects that only BLE communication is established with the digital camera 100, it is also conceivable to carry out display processing in which the processing of steps S312 and S313 is not executed, and instead, text reading "cannot display" is displayed at the same time as the GUI illustrated in FIG. 5D is displayed, with the text then switching to "preparing display" after the wireless LAN communication connection has been started in S311.

As another means, if the short distance communication unit 112 and the short distance communication unit 212 use Bluetooth (registered trademark) Classic, which is BLE but which has a faster data transfer speed and is capable of transferring more data at one time, as the second communication in the present embodiment, a live view corresponding to the data size that can be transferred by Bluetooth (registered trademark) Classic can be returned by the digital camera 100 and S312 and S313. However, the data size is smaller than that of the live view sent over a wireless LAN, which is the first communication, and thus a lower-resolution and less-visible live view will be sent. Processing such as that described above is employed because although the BLE connection takes less time to complete, the data transfer speed thereof is slower, and a smaller amount of data can be sent at one time, than with wireless LAN, and thus BLE is not suited to transferring large pieces of data such as live view images.

In S315, the control unit 201 detects that the user has, through the operation unit 205, operated GUI 507 to change the zoom position, operated GUI 509 to change setting parameters (not shown) such as ISO and exposure correction, or the like. In S316, the control unit 201 makes an instruction for changing shooting setting parameters in the digital camera 100 via the short distance communication unit 212.

Upon detecting the instruction to change the shooting parameters from the mobile phone 200 via the short distance communication unit 112 in S317, the control unit 101 changes the specified shooting parameters and returns an indication that the shooting parameters have been changed to the mobile phone 200 via the short distance communication unit 112.

In S318, the control unit 201 detects that the user has, through the operation unit 205, operated GUI 511 and instructed a shot to be taken. Then, in S319, the control unit 201 makes an instruction to take a shot to the digital camera 100 via the short distance communication unit 212.

In S320, upon detecting the instruction to take a shot from the mobile phone 200 via the short distance communication unit 112, the control unit 101 starts a shooting process. The control unit 101 uses the image sensor to convert subject light, formed as an image by the lens included in the image capturing unit 102, into an electrical signal, carries out noise reduction processing and the like, outputs digital data as image data, temporarily records the image data into the work memory 104, and then records that data in the recording medium as an image file. Although the present embodiment describes shooting a still image as an example, the same applies when recording a moving image. Then, in S321, when the shooting is complete, the control unit 101 returns an indication that the shooting is complete to the mobile phone 200 via the short distance communication unit 112.

The reason that the changing of the camera settings, shooting, and so on are processed as described above in S315 to S321 is that unlike the live view, instructions for changing the camera settings, instructions for shooting, and the like require only small amounts of data to be sent, and thus even communication such as BLE, which has a slower data transfer speed and can only send small amounts of data at one time, provides a fully sufficient responsiveness.

In S322, the control unit 201 detects that the user has, through the operation unit 205, selected GUI 514 and instructed a thumbnail of the shot image to be displayed. In S323, the control unit 201 makes a request to the digital camera 100, via the short distance communication unit 212, to acquire thumbnail data of the shot image.

In S324, upon detecting the instruction to acquire the thumbnail data of the image from the mobile phone 200 via the short distance communication unit 112, the control unit 101 sends, to the digital camera 100, an indication that the thumbnail data cannot be transferred. Note that it is also possible to send a thumbnail data if the short distance communication unit 112 and the short distance communication unit 212 use Bluetooth (registered trademark) Classic, which is BLE but which has a faster data transfer speed and is capable of transferring more data at one time, as the second communication in the present embodiment. Furthermore, the reasons for carrying out the processing as described above are the same as with the live view described earlier, and thus detailed descriptions thereof will be omitted.

Figure 4D:
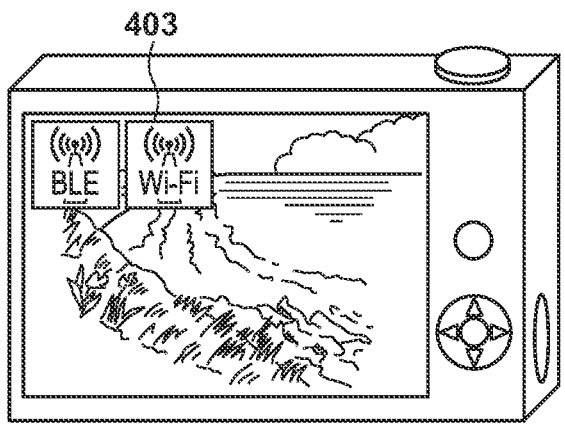
Figure 4E:
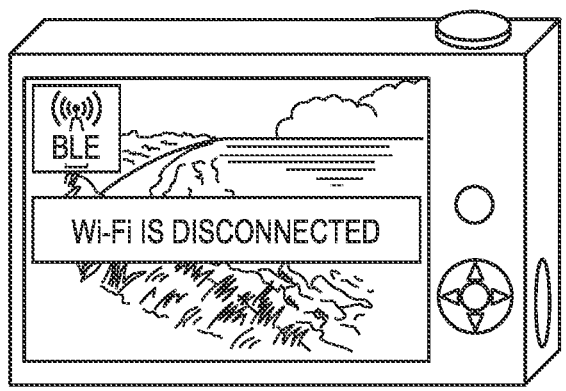

In S325, the control unit 101 of the digital camera 100 detects the establishment of a first communication connection, i.e., a wireless LAN (Wi-Fi) connection, via the communication unit 111. The control unit 201 of the mobile phone 200 also detects the establishment of a first communication connection via the communication unit 211. This step indicates that a protocol layer connection (not shown) is also established, and that a state in which data can be exchanged has been established. Once the first communication connection is established, the control unit 101 of the digital camera 100 displays an icon 403, indicating that a wireless LAN connection has been established, in the display unit 106, as indicated in FIG. 4D. Additionally, the control unit 201 of the mobile phone 200 displays an icon 515, indicating that a wireless LAN connection has been established, in the display unit 206, as indicated in FIG. 5E.

In S326, the control unit 201 makes an instruction for acquiring the camera setting information of the digital camera 100 via the communication unit 211. The "camera setting information" is the same information as that described with reference to S307, and is information valid only in the wireless LAN communication carried out via the communication unit 111 and the communication unit 211.

In S327, upon detecting the instruction to acquire the camera setting information from the mobile phone 200 via the communication unit 111, the control unit 101 returns the camera setting information to the mobile phone 200 via the communication unit 111.

Although the present embodiment describes a format in which the camera setting information communicated over BLE and the camera setting information communicated over the wireless LAN are separate from each other, these pieces of information may be communicated together instead. In this case, the format may be such that only the information that can be set through BLE communication is communicated in S308, and the information that can newly be set through wireless LAN communication is added and returned in S326. Because wireless LAN communication is possible thereafter, the digital camera 100 can respond to all of the requests from the mobile phone 200.

In S328, the control unit 201 sends a request to acquire the live view data from the digital camera 100 via the communication unit 211.

In S329, upon detecting that the request to acquire the live view data has been received from the mobile phone 200 via the communication unit 111, the control unit 101 sends the live view data to the mobile phone 200 via the communication unit 111.

In S330, the control unit 201 continues to display the live view data in GUI 516, indicated in FIG. 5E, by repeating S328 and S329.

In S331, the control unit 201 detects that the user has, through the operation unit 205, operated GUI 511 and instructed a shot to be taken. In this case, in S332, the control unit 201 sends a request to take a shot to the digital camera 100 via the communication unit 211.

In S333, upon detecting that the request to take a shot has been received from the mobile phone 200 via the communication unit 111, the control unit 101 starts the shooting process. The shooting process is the same as that of S320, and thus descriptions thereof will be omitted here.

In S334, when the shooting is complete, the control unit 101 returns information indicating that the shooting is complete to the mobile phone 200 via the communication unit 111.

In S335, the control unit 201 detects that the user has, through the operation unit 205, operated GUI 517 and instructed the shot image to be displayed. In S336, the control unit 201 sends a request to acquire the shot image to the digital camera 100 via the communication unit 211.

In S337, upon detecting that the request to acquire the image has been received from the mobile phone 200 via the communication unit 111, the control unit 101 copies the image recorded in the recording medium 110 (the most recent captured image; the image captured in S333) to the work memory 104 and sends the image to the mobile phone 200 via the communication unit 111. The control unit 201 displays the image received from the digital camera in GUI 518, indicated in FIG. 5F.

The reason the processing is carried out as described above is that although wireless LAN takes a long time to complete a connection, wireless LAN has a fast data transfer speed and can send a large amount of data at one time, and is therefore suited to sending data such as images.

In S338, upon detecting that the user has, through the operation unit 205, instructed a return to the home screen using GUI 512, the control unit 201 displays the content illustrated in FIG. 5A in the display unit 206.

In S339, the control unit 201 disconnects from the wireless LAN via the communication unit 211. In the present embodiment, the digital camera 100 is the access point, and thus the wireless LAN connection with the digital camera 100 is disconnected. If the digital camera 100 has joined an access point that can enter the same network as the mobile phone 200, the connection with the joined access point is disconnected.

Note that before displaying the content of FIG. 5A in S338, the control unit 201 may disconnect from the wireless LAN in response to the user instruction to return to the home screen and then display the content of FIG. 5A after disconnecting. Alternatively, the wireless LAN disconnect and the display of the content in FIG. 5A may be executed in parallel in response to the user operation being accepted in S338.

In S340, the digital camera 100 and the mobile phone 200 disconnect the wireless LAN (Wi-Fi) communication via the control unit 101 and the control unit 201. The digital camera 100, which can no longer communicate with the mobile phone 200, displays a GUI indicating that the wireless LAN has been disconnected (FIG. 4E) in the display unit 106. The wireless LAN is disconnected when returning to the home screen because wireless LAN consumes more power than BLE. As such, disconnecting when the wireless LAN connection is not needed enables the more efficient use of power.

Although the present embodiment describes a case where the wireless LAN is disconnected when returning to the home screen, other cases can be considered as well. For example, there is a function, "view images in camera", as indicated by GUI 501 in the home screen of the application, illustrated in FIG. 5A. This is a function through which images recorded in the recording medium 110 of the digital camera 100 are displayed as a list of thumbnail images, image previews, or the like, as indicated by GUI 519 in FIG. 5B, GUI 520 in FIG. 5C, and so on.

Because images, which contain large amounts of data, are transferred, it is conceivable to carry out processing in which the wireless LAN is not disconnected upon returning to the home screen in S338, but is instead maintained for a set amount of time, and is then disconnected when no action is taken thereafter. If the disconnect is to be made manually, a button for instructing the wireless LAN to be disconnected is provided in the home screen. Although the wireless LAN may be disconnected upon returning to the home screen in S338, and an attempt to reconnect to the wireless LAN may then be made in response to GUI 501 being selected, it is necessary to wait for a short while for the connection with the wireless LAN to be established in such a case.

The foregoing has described, in detail, a sequence of operations according to the present embodiment, in which the digital camera 100 is remotely controlled from the mobile phone 200 on the basis of first communication, in which the digital camera 100 and the mobile phone 200 communicate via the communication unit 111 and the communication unit 211, and second communication, in which the digital camera 100 and the mobile phone 200 communicate via the short distance communication unit 112 and the short distance communication unit 212.

Operations of Digital Camera 100 in Communication Sequence

Figure 6:
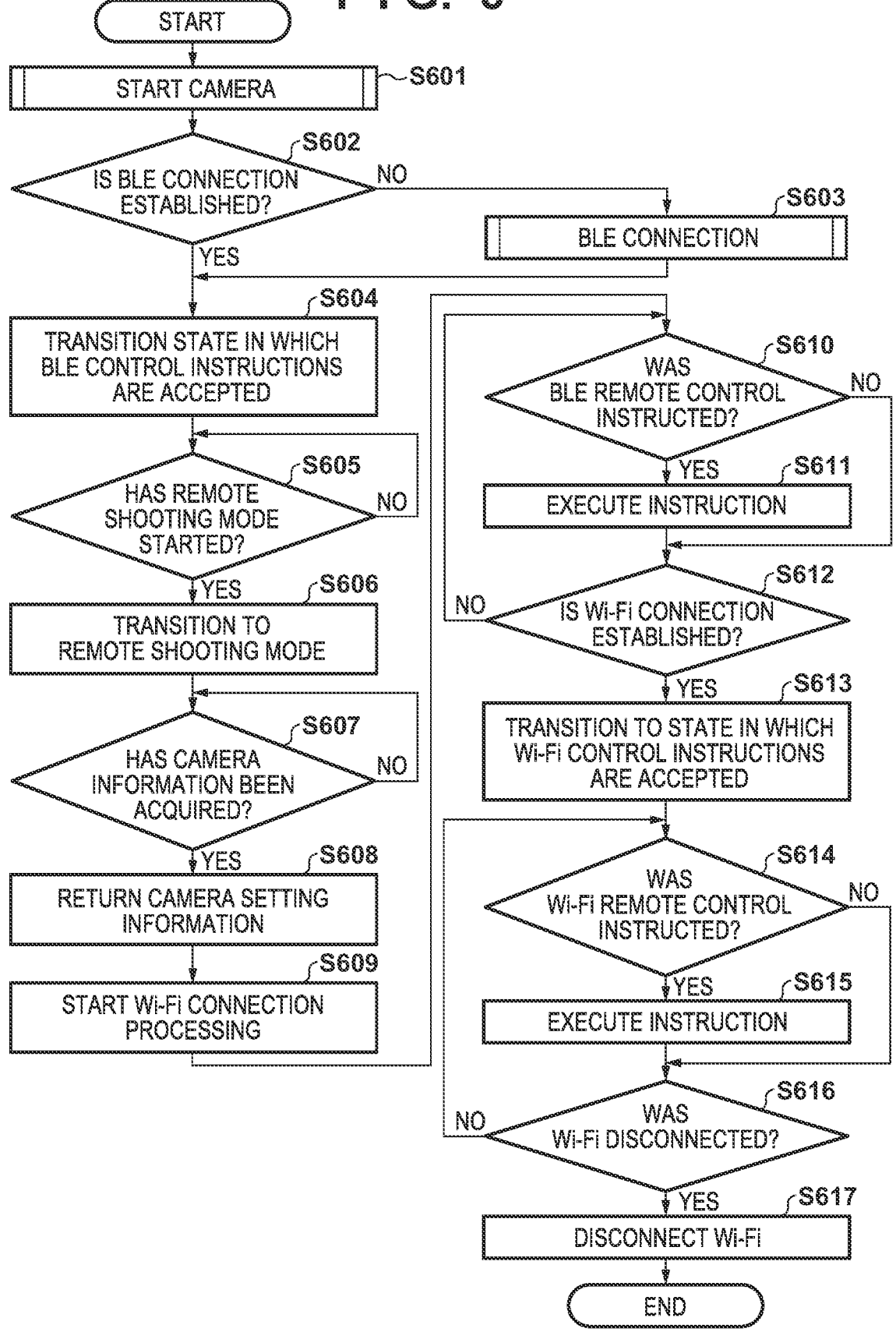
FIG. 6 is a flowchart illustrating processing by the digital camera according to the first embodiment.

Next, a flow of processing by the digital camera 100 when the digital camera 100 is remotely controlled from the mobile phone 200 using the first and second communication will be described with reference to FIG. 6. A program realizing the processing in FIG. 6 is assumed to be stored in the non-volatile memory 103.

In S601, the control unit 101 starts up the digital camera 100. This corresponds to S301 in FIGS. 3A and 3B.

In S602, the control unit 101 determines whether or not a BLE communication connection (the second communication) is already established with the mobile phone 200. The control unit 101 moves the processing to S603 if the connection is not yet established, and moves the processing to S604 if the connection is already established.

In S603, the control unit 101 establishes a second communication (BLE) connection with the mobile phone 200 through the short distance communication unit 112. This corresponds to S303 in FIGS. 3A and 3B.

In S604, after the BLE connection has been established with the mobile phone 200, the control unit 101 transitions to a state in which an instruction from the mobile phone 200 is accepted via the short distance communication unit 112.

In S605, the control unit 101 detects whether or not an instruction to start the remote shooting mode has been received from the mobile phone 200. If the instruction has not been received, the control unit 101 repeats the processing of S605. If the instruction has been received, the control unit 101 moves the processing to S606. In S606, the control unit 101 transitions the digital camera 100 to a state in which shooting, live view display, and the like can be carried out. This corresponds to S306 in FIGS. 3A and 3B.

In S607, the control unit 101 determines whether or not a request to acquire the camera setting information has been received. If the request has not been received, the control unit 101 repeats the processing of S607. If the request has been received, the control unit 101 moves the processing to S608. In S608, the control unit 101 returns the camera setting information. This corresponds to S308 in FIGS. 3A and 3B.

In S609, the control unit 101 starts the first communication (wireless LAN (Wi-Fi)) connection processing using the communication unit 111. This corresponds to S309 in FIGS. 3A and 3B.

In S610, the control unit 101 detects whether or not an instruction to control remote shooting through BLE via the short distance communication unit 112 has been received. If the instruction has been received, the control unit 101 moves the processing to S611. If the instruction has not been received, the control unit 101 moves the processing to S612.

In S611, the control unit 101 processes the instruction to control remote shooting through BLE via the short distance communication unit 112. This corresponds to S313, S317, S320, S321, and S324 in FIGS. 3A and 3B.

In S612, the control unit 101 detects whether or not a wireless LAN connection has been established. If it is determined that the establishment has been detected, the control unit 101 moves the processing to S613. If such is not the case, however, the control unit 101 repeats the processing of S610 and S611, and repeats the processing based on the instruction to control remote shooting that can be used through BLE via the short distance communication unit 112.

In S613, after the connection with the mobile phone 200 has been established via wireless LAN (the first communication), the control unit 101 transitions to a state in which an instruction can be received from the mobile phone 200 via the communication unit 111.

In S614, the control unit 101 detects whether or not an instruction to control remote shooting through wireless LAN has been received by the communication unit 111. If the instruction has been received, the control unit 101 moves the processing to S615. If the instruction has not been received, however, the control unit 101 moves the processing to S616.

In S615, the control unit 101 processes the instruction to control remote shooting through wireless LAN via the communication unit 111. This corresponds to S327, S329, S333, S334, and S337 of FIGS. 3A and 3B.

In S616, the control unit 101 detects whether or not the wireless LAN communication with the mobile phone 200 has been disconnected. If it is determined that the disconnect has been detected, the control unit 101 moves the processing to S617. If such is not the case, the control unit 101 repeats the processing of S614 and S615 until the disconnect is detected, and repeats the processing based on the instruction to control remote shooting through the wireless LAN via the communication unit 111.

The foregoing has been a description of the flow of processing by the digital camera 100 according to the embodiment.

Operations of Mobile Phone 200 in Communication Sequence

Figure 7:
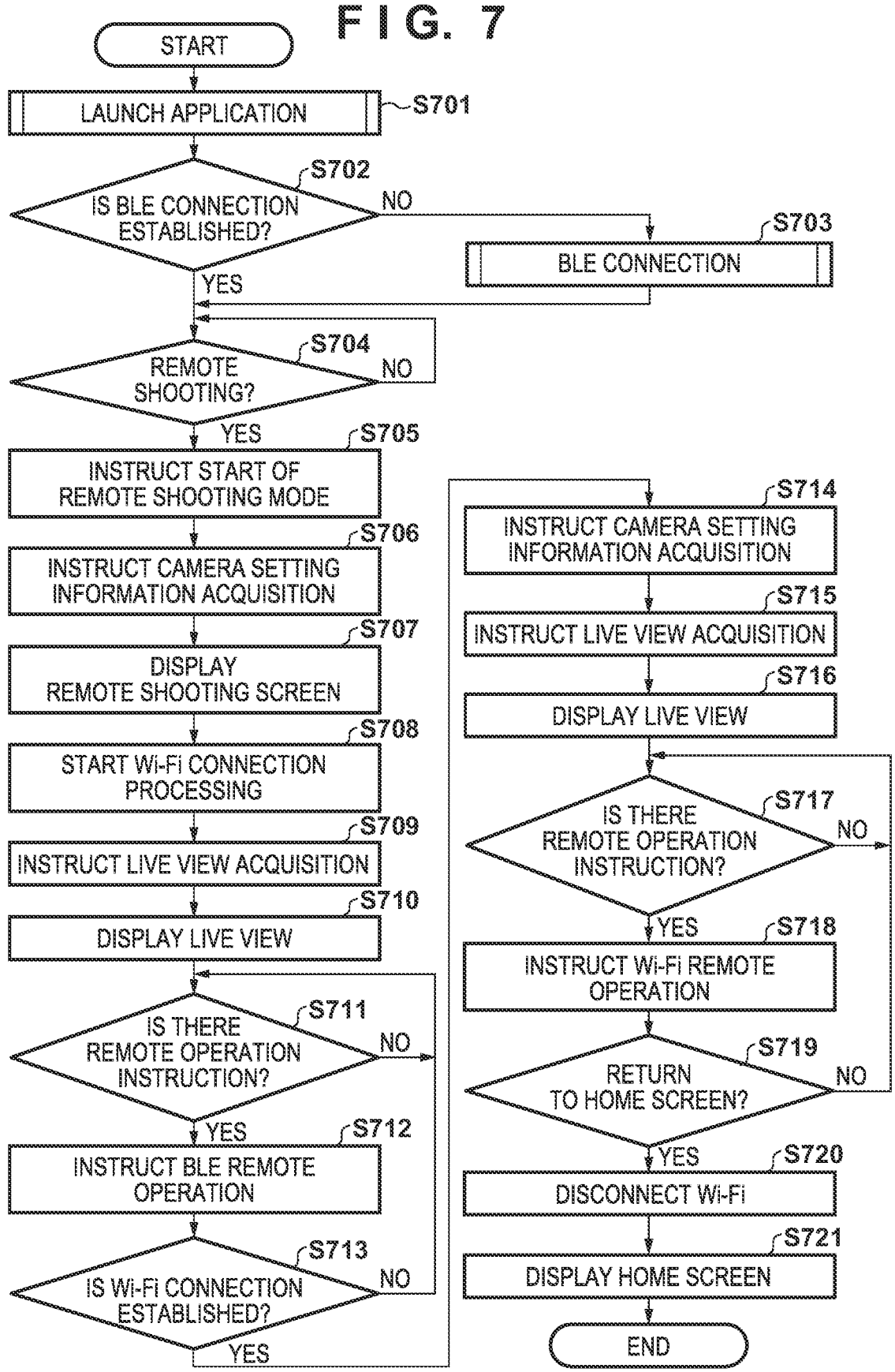
FIG. 7 is a flowchart illustrating processing by the mobile phone according to the first embodiment.

The flow of processing by the mobile phone 200 when the digital camera 100 is remotely controlled from the mobile phone 200 using the first communication and the second communication will be described next with reference to the flowchart in FIG. 7. A program realizing the processing in FIG. 7 is assumed to be stored in the non-volatile memory 203.

In S701, the control unit 201 launches the application. This corresponds to S302 in FIGS. 3A and 3B.

In S702, the control unit 201 determines whether or not BLE communication has already been established with the digital camera 100 via the short distance communication unit 212. The control unit 201 moves the processing to S703 if the connection is not yet established. The control unit 201 moves the processing to S704 if the connection is already established.

In S703, the control unit 201 establishes a BLE connection with the digital camera 100. This corresponds to S303 in FIGS. 3A and 3B.

In S704, the control unit 201 detects whether or not an instruction to start the remote shooting mode has been made through a user operation. The control unit 201 moves the processing to S705 if the instruction has been detected, and repeats the processing of S704 when such is not the case.

In S705, the control unit 201 sends a request to start the remote shooting mode to the digital camera 100 via the short distance communication unit 212. This corresponds to S305 in FIGS. 3A and 3B.

In S706, the control unit 201 sends a request to acquiring the camera setting information to the digital camera 100 via the short distance communication unit 212. This corresponds to S307 in FIGS. 3A and 3B.

In S707, the control unit 201 displays a screen (GUI) for remote shooting. This corresponds to S310 in FIGS. 3A and 3B.

In S708, the control unit 201 starts the wireless LAN (Wi-Fi) connection processing. This corresponds to S311 in FIGS. 3A and 3B.

In S709, the control unit 201 sends an instruction to acquire a live view to the digital camera 100. This corresponds to S312 in FIGS. 3A and 3B.

In S710, the control unit 201 displays a live view screen. This corresponds to S314 in FIGS. 3A and 3B.

In S711, the control unit 201 detects whether or not there has been an instruction for remote operation. This corresponds to S315, S318, and S322 in FIGS. 3A and 3B. The processing moves to S712 if the instruction is detected. The processing of S711 is repeated if such is not the case.

In S712, the control unit 201 instructs the digital camera 100 to be remotely operated via BLE. This corresponds to S316, S318, and S323 in FIGS. 3A and 3B.

In S713, the control unit 201 detects whether or not a wireless LAN connection has been established. If it is determined that the disconnect has been detected, the control unit 201 moves the processing to S714. If a wireless LAN connection has not yet been established, the control unit 201 repeats the processing of S711 and S712. In other words, the control unit 201 repeatedly instructs the control of remote shooting via BLE through the short distance communication unit 212, and carries out processing based on the response to the instruction from the digital camera 100, until the wireless LAN connection is established.

In S714, the control unit 201 makes an instruction for acquiring the camera setting information via the communication unit 211. This corresponds to S326 in FIGS. 3A and 3B.

In S715, the control unit 201 makes an instruction for acquiring the live view via the communication unit 211. This corresponds to S328 in FIGS. 3A and 3B.

In S716, the control unit 201 displays a live view. This corresponds to S330 in FIGS. 3A and 3B.

In S717, the control unit 201 detects whether or not there has been an instruction for remote operation. This corresponds to S331 and S335 in FIGS. 3A and 3B. If it is determined that the instruction has been detected, the control unit 201 moves the processing to S718. The control unit 201 repeats the processing of S717 if such is not the case.

In S718, the control unit 201 instructs the digital camera 100 to be remotely operated via the communication unit 211 (via wireless LAN). This corresponds to S332 and S336 in FIGS. 3A and 3B.

In S719, the control unit 201 detects whether or not there has been an instruction to return to the home screen. This corresponds to S338 in FIGS. 3A and 3B. If it is determined that the instruction has been detected, the control unit 201 moves the processing to S720. If such is not the case, the control unit 201 repeats the processing of S717 and S718, repeatedly instructing the control of remote shooting via wireless LAN through the communication unit 211, and carrying out processing based on the response to the instruction from the digital camera 100.

In S720, the control unit 201 disconnects the wireless LAN communication with the digital camera 100. This corresponds to S339 and S340 in FIGS. 3A and 3B.

In S721, the control unit 201 displays the home screen of the application. Note that S721 and S720 may be executed in the reverse order.

The foregoing has been a description of the flow of processing by the mobile phone 200 according to the embodiment.

An advantage of the present embodiment is that the first communication, which takes a long time to establish a connection but which has a fast data transfer speed and can send a large amount of data at one time, such as wireless LAN, and second communication, which does not take a long time to establish a communication from when the processing is started but which has a slow data transfer speed and can only send a small amount of data at one time, such as BLE, can be used separately depending on the circumstances. The user can carry out remove shooting without paying particular attention to the first or second communication, and without requiring operations for switching between the first and second communication, which makes it possible to avoid missing shooting opportunities.

Second Embodiment

The foregoing first embodiment describes a sequence in which a wireless LAN (Wi-Fi) connection is started automatically, regardless of user operations, after the digital camera 100 and the mobile phone 200 have established a BLE connection.

The present second embodiment will describe an operating sequence in which the wireless LAN connection processing is started in response to the user having carried out an operation that requires communication means having a fast data transfer speed and capable of sending a large amount of data at one time, as is the case with live view.

Figure 8B:
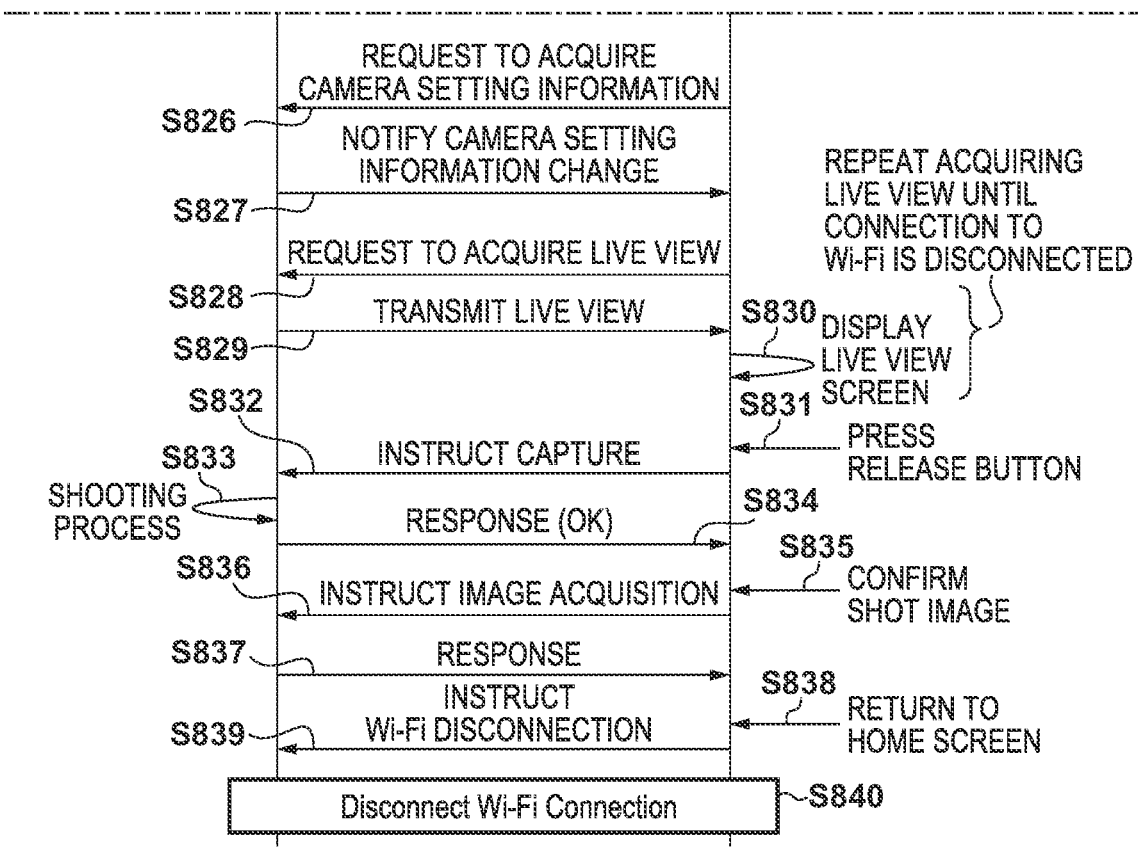

FIGS. 8A and 8B illustrate, in detail, sequences of operations in which the digital camera 100 is remotely controlled from the mobile phone 200 through first communication, in which the digital camera 100 and the mobile phone 200 communicate via the communication unit 111 and the communication unit 211, and second communication, in which the digital camera 100 and the mobile phone 200 communicate via the short distance communication unit 112 and the short distance communication unit 212.

S801 to S808 are the same as the processing in S301 to S308, and thus descriptions thereof will be omitted.

In S809, the control unit 201 detects that the user has operated the operation unit 205 to touch GUI 513, i.e., to input an instruction to display the live view.

In S810, the control unit 201 makes an instruction for a request to acquire the live view from the digital camera 100 via the short distance communication unit 212.

In S811, upon receiving the request to acquire the live view via the short distance communication unit 112, the control unit 101 returns information, indicating that a wireless LAN connection will be started so that the live view can be acquired, to the mobile phone 200.

In S812, the control unit 101 starts the wireless LAN connection processing in response to the reception in S810.

In S813, the control unit 201 displays "preparing display" in GUI 513.

In S814, the control unit 201 starts the wireless LAN connection processing in response to the reception in S811.

S815 to S839 are the same as the processing in S315 to S339, and thus descriptions thereof will be omitted. In S840, the Wi-Fi connection between the digital camera 100 and the mobile phone 200 is disconnected.

FIG. 9 illustrates the flow of processing by the mobile phone 200 when the digital camera 100 is remotely controlled from the mobile phone 200 using the first communication, in which the digital camera 100 and the mobile phone 200 communicate via the communication unit 111 and the communication unit 211, and the second communication, in which the digital camera 100 and the mobile phone 200 communicate via the short distance communication unit 112 and the short distance communication unit 212.

S901 to S906 are the same as the processing in S701 to S706, and thus descriptions thereof will be omitted. Likewise, S907 is the same as the processing in S711, and thus descriptions thereof will be omitted.

In S908, the control unit 201 detects that the instruction made by the user through the operation unit 205 is for acquiring the live view. The control unit 201 moves the processing to S909 when the instruction has been detected, and moves the processing to S910 when such is not the case. S909 is the same as the processing in S712, and thus descriptions thereof will be omitted.

In S910, the user operation for instructing the live view to be acquired has been detected, and thus the control unit 201 makes an instruction to the digital camera 100 for acquiring the live view in response to the user operation made through the operation unit 205. As a result, the control unit 201 receives, from the digital camera 100, information indicating that the wireless LAN connection will be started.

In S911, the control unit 201 displays "preparing display" in GUI 513. This corresponds to S813 in FIGS. 8A and 8B.

In S912, the control unit 201 starts the wireless LAN connection processing. This corresponds to S814 in FIGS. 8A and 8B.

In S913, the control unit 201 detects whether or not a wireless LAN connection has been established. If the establishment of the connection has been detected, the control unit 201 moves the processing to S914. If a wireless LAN connection has not yet been established, the control unit 201 returns the processing to S907.

S914 to S921 are the same as the processing in S714 to S721, and thus descriptions thereof will be omitted.

Figure 5F:
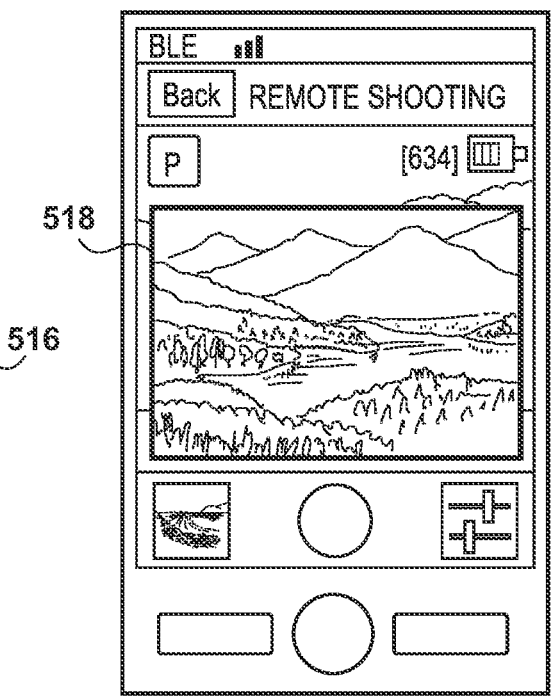
Figure 5G:
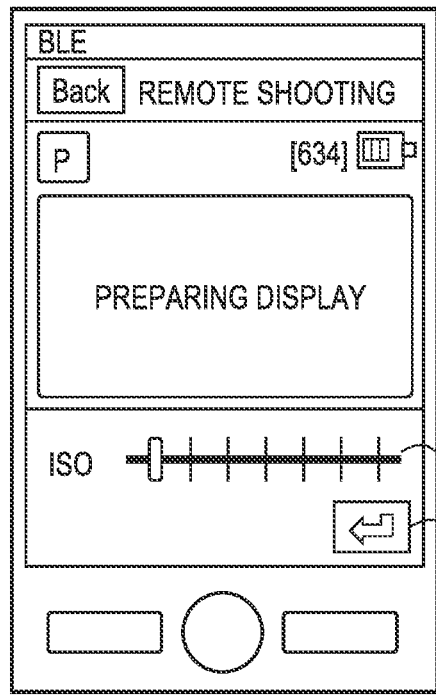

Although the present embodiment describes processing carried out when a request to acquire the live view has been detected, the wireless LAN connection may be started in response to an acquisition request, made through a user operation, for large-sized data, such as the images of GUI 518 in FIG. 5F, GUI 519 in FIG. 5B, and GUI 520 in FIG. 5C.

Although the present embodiment describes a mobile phone as the device operated by the user and a digital camera as the device to be operated, the types of the operating and operated devices are not particularly limited. The devices may be output devices such as printers, mobile terminals such as smartphones or tablets, and the like.

Additionally, although the present embodiment describes the digital camera 100, which has the wireless communication function built in, as an example, the configuration may be such that a recording medium capable of wireless communication is attached to the digital camera 100 and controls wireless communication as the recording medium 110. In this case, too, the same control as that described in the present embodiment is carried out with respect to a wireless circuit unit in the recording medium capable of wireless communication.

Furthermore, the present invention can also be applied in a system in which the digital camera 100 is remotely controlled from a PC or the like. In this case, the remote control can be implemented by a control unit of the PC making various types of inquiries, control requests, and the like to the control unit 101 of the digital camera 100.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-081736, filed Apr. 20, 2018, which is hereby incorporated by reference herein in its entirety.

What is claimed is:

1. An electronic apparatus that carries out wireless communication with an image capturing device and functions as an apparatus that controls the image capturing device wirelessly, the electronic apparatus comprising:
a display unit;
a first wireless communication circuit for wireless communication;
a second wireless communication circuit for wireless communication having a slower communication speed than the first wireless communication circuit; and
a control unit that controls the communication carried out via the first and second wireless communication circuits and controls the display unit,
wherein the control unit:
acquires setting information for controlling the image capturing device from the image capturing device when a communication connection has been established with the image capturing device by the second wireless communication circuit; and
transitions to an apparatus that controls the image capturing device by displaying, in the display unit, a GUI for controlling the image capturing device on the basis of the acquired setting information, and
wherein the control unit furthermore:
starts connection processing via the first wireless communication circuit when pre-set information has been received via the second wireless communication circuit;
sends a user instruction, made in the GUI displayed in the display unit, via the second wireless communication circuit, during a period up until a communication connection is established by the first wireless communication circuit; and
carries out control so that after the communication connection has been established by the first wireless communication circuit, the user instruction, made in the GUI displayed in the display unit, is sent via the second wireless communication circuit,
wherein a layout of the GUI displayed during a period up until the communication connection is established by the first wireless communication circuit and a layout of the GUI displayed after the communication connection is established by the first wireless communication circuit are the same,
wherein the layout of the GUI includes an area in which a live image received from the image capturing device is displayed,
wherein an image indicating that the live image cannot be displayed is displayed in the area during a period up until wireless communication connection by the first wireless communication circuit is established, an image indicating that the live image is being prepared is displayed in the area while the reception of the live image to be displayed has not been completed after the wireless communication connection by the first wireless communication circuit is established, and the live image is displayed in the area after the live image to be displayed is received via the first wireless communication circuit, and
wherein a processor, which executes a program stored in a memory, functions as the control unit.

2. The apparatus according to claim 1, wherein the pre-set information is setting information of the image capturing device, pertaining to image capturing.

3. The apparatus according to claim 1, wherein the pre-set information is information of a response to a request for an image sent to the image capturing device.

4. The apparatus according to claim 1, wherein the first wireless communication circuit communicates via wireless LAN; and
the second wireless communication circuit communicates via Bluetooth (registered trademark) or Bluetooth (registered trademark) Low Energy.

5. A method of controlling an electronic apparatus, the electronic apparatus including a display unit, a first wireless communication circuit for wireless communication, and a second wireless communication circuit for wireless communication having a slower communication speed than the first wireless communication circuit, the electronic apparatus carrying out wireless communication with an image capturing device and functioning as an apparatus that controls the image capturing device wirelessly, the method comprising:
controlling the communication carried out via the first and second wireless communication circuits and the display unit,
wherein in the controlling:
setting information for controlling the image capturing device is acquired from the image capturing device when a communication connection has been established with the image capturing device by the second wireless communication circuit; and
the electronic apparatus transitions to an apparatus that controls the image capturing device by displaying, in the display unit, a GUI for controlling the image capturing device on the basis of the acquired setting information, and
in the controlling, furthermore:
connection processing via the first wireless communication circuit is started when pre-set information has been received via the second wireless communication circuit;
a user instruction, made in the GUI displayed in the display unit, is sent via the second wireless communication circuit, during a period up until a communication connection is established by the first wireless communication circuit; and
control is carried out so that after the communication connection has been established by the first wireless communication circuit, the user instruction, made in the GUI displayed in the display unit, is sent via the second wireless communication circuit,
wherein a layout of the GUI displayed during a period up until the communication connection is established by the first wireless communication circuit and a layout of the GUI displayed after the communication connection is established by the first wireless communication circuit are the same,
wherein the layout of the GUI includes an area in which a live image received from the image capturing device is displayed, and
wherein an image indicating that the live image cannot be displayed is displayed in the area during a period up until wireless communication connection by the first wireless communication circuit is established, an image indicating that the live image is being prepared is displayed in the area while the reception of the live image to be displayed has not been completed after the wireless communication connection by the first wireless communication circuit is established, and the live image is displayed in the area after the live image to be displayed is received via the first wireless communication circuit.

6. A non-transitory computer-readable storage medium storing a program that, when read and executed by a computer having a display unit, a first wireless communication circuit for wireless communication, and a second wireless communication circuit for wireless communication having a slower communication speed than the first wireless communication circuit, causes the computer to carry out wireless communication with an image capturing device and function as an apparatus that controls the image capturing device wirelessly, the program causing the computer to:

acquire setting information for controlling the image capturing device from the image capturing device when a communication connection has been established with the image capturing device by the second wireless communication circuit;

transition to a device that controls the image capturing device by displaying, in the display unit, a GUI for controlling the image capturing device on the basis of the acquired setting information;

start connection processing via the first wireless communication circuit when pre-set information has been received via the second wireless communication circuit;

send a user instruction, made in the GUI displayed in the display unit, via the second wireless communication circuit, during a period up until a communication connection is established by the first wireless communication circuit; and carry out control so that after the communication connection has been established by the first wireless communication circuit, the user instruction, made in the GUI displayed in the display unit, is sent via the second wireless communication circuit, wherein a layout of the GUI displayed during a period up until the communication connection is established by the first wireless communication circuit and a layout of the GUI displayed after the communication connection is established by the first wireless communication circuit are the same, wherein the layout of the GUI includes an area in which a live image received from the image capturing device is displayed, and wherein an image indicating that the live image cannot be displayed is displayed in the area during a period up until wireless communication connection by the first wireless communication circuit is established, an image indicating that the live image is being prepared is displayed in the area while the reception of the live image to be displayed has not been completed after the wireless communication connection by the first wireless communication circuit is established, and the live image is displayed in the area after the live image to be displayed is received via the first wireless communication circuit.

* * * * *